United States Patent
Chen et al.

(10) Patent No.: US 11,155,707 B2
(45) Date of Patent: Oct. 26, 2021

(54) ANTI-FATIGUE COLD MIXED EPOXY RESIN MATERIAL, PREPARATION METHOD AND APPLICATION THEREOF

(71) Applicant: JIANGSU SINOROAD TRANSPORTATION SCIENCE AND TECHNOLOGY CO., LTD., Nanjing (CN)

(72) Inventors: Lifeng Chen, Nanjing (CN); Zhixiang Zhang, Nanjing (CN); Youqiang Pan, Nanjing (CN); Kuan Li, Nanjing (CN); Yongsheng Guan, Nanjing (CN); Tao Ma, Nanjing (CN); Qiang Liu, Nanjing (CN); Cheng Du, Nanjing (CN)

(73) Assignee: JIANGSU SINOROAD TRANSPORTATION SCIENCE AND TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 16/771,169

(22) PCT Filed: May 6, 2019

(86) PCT No.: PCT/CN2019/085675
§ 371 (c)(1),
(2) Date: Jun. 9, 2020

(87) PCT Pub. No.: WO2020/223872
PCT Pub. Date: Nov. 12, 2020

(65) Prior Publication Data
US 2021/0253842 A1 Aug. 19, 2021

(51) Int. Cl.
| | | |
|---|---|---|
| C08L 63/00 | (2006.01) | |
| C08G 18/12 | (2006.01) | |
| C08G 18/61 | (2006.01) | |
| C08G 18/63 | (2006.01) | |
| C08G 18/76 | (2006.01) | |
| C08G 59/24 | (2006.01) | |
| C08G 59/40 | (2006.01) | |
| C08G 59/50 | (2006.01) | |
| E01C 7/35 | (2006.01) | |

(52) U.S. Cl.
CPC ............ *C08L 63/00* (2013.01); *C08G 18/12* (2013.01); *C08G 18/61* (2013.01); *C08G 18/63* (2013.01); *C08G 18/7657* (2013.01); *C08G 59/245* (2013.01); *C08G 59/4014* (2013.01); *C08G 59/502* (2013.01); *C08G 59/5033* (2013.01); *E01C 7/356* (2013.01); *C08G 2170/00* (2013.01)

(58) Field of Classification Search
None
See application file for complete search history.

(56) References Cited

U.S. PATENT DOCUMENTS

| | | | | |
|---|---|---|---|---|
| 4,518,758 | A * | 5/1985 | Cavezzan | C08G 18/61 525/474 |
| 9,828,534 | B2 * | 11/2017 | Renkel | B29C 43/12 |
| 2004/0197563 | A1 * | 10/2004 | Kye | C09J 163/00 428/413 |
| 2005/0154170 | A1 * | 7/2005 | Klaassens | C09D 183/10 528/27 |
| 2009/0308534 | A1 * | 12/2009 | Malone | C09J 163/00 156/330 |

FOREIGN PATENT DOCUMENTS

| | | |
|---|---|---|
| CN | 101775893 A | 7/2010 |
| CN | 101818037 B | 12/2014 |
| CN | 106085321 A | 11/2016 |

* cited by examiner

*Primary Examiner* — Christopher M Rodd
(74) *Attorney, Agent, or Firm* — SZDC Law PC (57) ABSTRACT

The invention relates to an anti-fatigue cold mixed epoxy resin material, preparation method and application thereof, comprising component A and component B with mass ratio of 1:1-10:1, component A comprising fluid epoxy resin, active toughener, active diluents, coupling agent and defoamer; component B is any one of or a mixture of two or more than two of alicyclic amine or amino terminated polyether, cyanoethylamine, phenolic modified amine or hydroxyalkyl modified amine. Introduced epoxy terminated organosilicon block polyurethane prepolymer breaks the limitation that elongation at fracture of epoxy resin system based on "sea-island structure" is difficult to break through 100%. The invention is suitable for bridge deck pavement of long-span cable bearing bridge, waterproof bonding material or used for airport pavement, municipal viaduct, ramp and other occasions with high requirements for fatigue resistance of pavement material.

8 Claims, 2 Drawing Sheets

ANTI-FATIGUE COLD MIXED EPOXY RESIN MATERIAL, PREPARATION METHOD AND APPLICATION THEREOF

This application is the National Stage Application of PCT/CN2019/085675, filed on May 6, 2019.

TECHNICAL FIELD

The invention relates to an anti-fatigue cold mixed epoxy resin material, preparation method and application thereof, in particular to an anti-fatigue cold mixed epoxy resin material with excellent fatigue resistance and preparation method thereof.

BACKGROUND

Orthotropic steel deck paving material is now widely used. Under a coupling effect of heavy load, high temperature and rainy service environment, different levels of damage occurred at the steel bridge deck pavement of the early construction, and resulting in a safety hazard. Traditional thermoplastic modified asphalt or thermosetting modified asphalt are designed, constructed and accepted with reference to the relevant technical indicators of ordinary asphalt pavement, ignoring that orthotropic steel deck paving is served under dynamic loads in a wide temperature range.

In order to satisfy the actual request of steel bridge deck paving on the fatigue resistance of paving material in a wide temperature range, international and domestic technicians use epoxy resin, polyurethane to modify common asphalt. Asphalt particles in the form of micro particles uniformly dispersed within thermosetting resin framework such as epoxy resin to form a toughening phase. For example, in US 20160257813 and US 20180312437, ordinary asphalt is toughening modified by polyurethane prepolymer, and in patent ZL 201510390948.7 adopts polyurea prepolymer to toughen and modify hot mixed epoxy asphalt. However, the long-term field application effect indicates that: Asphalt particles serving as a toughening phase are gradually precipitated under repeated wheel loads, their toughening effect is gradually lost, and the long-term fatigue resistance of the pavement material gradually decreases, which causes a large number of fatigue cracks.

In order to maintain good fatigue resistance of orthotropic steel deck paving material during long-term use, domestic and foreign researchers have gradually abandoned the use of asphalt with poor phase stability and easy precipitation as the toughening phase, and directly develop epoxy resin with good fatigue performance in a wide temperature range as orthotropic steel deck paving material.

In the existing epoxy modification technology, polyurethane prepolymer is used as the impact modifier of epoxy resin, but a performance increase extent in the fatigue resistance of epoxy resin is limited. For example, in US 20090288766, trimethylolpropane glycidyl ether is used to perform epoxidation modification on isocyanate terminated polyurethane prepolymer to prepare impact modifier for epoxy resin. In US 20130037213 and US 20060276601, the impact resistance of epoxy is modified, and the goal is to improve the brittleness of the epoxy, and the elongation at break is a few percent to ten percent or more. In CN 201710127566.4, polyurethane prepolymer with a hardness of A30-A70 is used as a tough component. Polyurethane prepolymer needs to be heated and melted before mixing with an epoxy resin and it has poor compatibility with epoxy resin, the elongation at break of the resulting resin material does not exceed 10%, which cannot meet the actual application requirements.

SUMMARY OF THE INVENTION

The main purpose of the present invention is to provide an anti-fatigue cold mixed epoxy resin material, preparation method and application thereof, which could represent ascendant itinerary property in the wide range of $-10°$ C.-$60°$ C., the fatigue resistance of the cold mixed epoxy resin material, is outstanding in the wide temperature range.

Another purpose of the invention is to provide a kind of pavement material which can be used for bridge deck pavement of long-span cable bearing bridge material, waterproof bonding material, airport pavement, municipal viaduct, ramp and other occasions with high requirements for fatigue performance of pavement material.

The purpose of the invention and the technical problem thereof are realized by adopting the following technical scheme. According to the invention, the anti-fatigue cold mixed epoxy resin material comprising, component A and component B with mass ratio of 1:1-10:1;

A mass composition of pond A is as follows:
fluid epoxy resin, 1-100 weight parts;
active toughener, 10-90 weight parts;
active diluents, 0-20 weight parts;
coupling agent, 0.1-5 weight parts;
defoamer, 0.01-2 weight parts;
A mass composition of pond B is as follows:
alicyclic amine or amino terminated polyether, 1-100 weight parts;
cyanoethylamine, phenolic modified amine or hydroxyalkyl modified amine, 1~100 weight parts.

Preferred, fluid epoxy resin can be bisphenol A epoxy resin, for example E54, E51, E44 etc. It also could be bisphenol F epoxy resin, or any combination thereof.

Preferred, the active toughening agent is the epoxy terminated organosilicon block polyurethane prepolymer prepared by the reaction of hydroxyl containing epoxy compound and organosilicon block polyurethane prepolymer. The active epoxy group in the epoxy terminated organosilicon block polyurethane prepolymer can participate in the crosslinking and curing reaction of epoxy resin, thus, a three-dimensional network structure of "interpenetrating" between flexible chain segment and rigid chain segment is formed, and the elongation at break can be adjusted successfully. The introduction of epoxy terminated organosilicon block polyurethane prepolymer breaks the limitation that it is difficult to break through 100% elongation at break of epoxy resin system toughened based on "sea-island structure."

Wherein, the epoxy compound containing hydroxyl is one or more mixtures of hydroxylglycidyl ether, bisphenol A type epoxy resin or bisphenol F type epoxy resin, wherein the silicone block polyurethane prepolymer is hydroxyl terminated polydimethylsiloxane, 2-functional polyether polyol, 2-functional polyester polyol and diisocyanate through the polymerization addition reaction; only two functional polyols are selected to introduce a longer flexible chain segment and lay a good foundation for improving the flexibility of materials. Based on the block copolymerization principle, the Si—O—Si flexible chain segment in organosilicon is introduced into the polyurethane prepolymer, and then the epoxy terminated organosilicon block polyurethane prepolymer is prepared by the addition reaction between the isocyanate terminated group in the organosilicon block polyurethane prepolymer and the hydroxyl group in the hydroxyl containing epoxy compound.

Preferred, the active diluent can be a single functional active diluent or a dual functional active diluent; the active diluent can be one of them, or a mixture of two or three, with a wide range of selection.

Preferred, alicyclic amine or amino terminated polyether can be one of them, or two mixtures, wherein alicyclic amine may be one or more mixtures of MDA, IPDA, AEP and 1,3-BAC; amino terminated polyether can be polyoxypropylenediamine, polyoxypropylene-triamine, polyoxyethylenediamine, or any combination thereof.

Preferred, cyanoethyl modified amines, phenolic modified amines or hydroxyalkyl modified amine in component B can be any one of or a mixture of two of the cyanoethyl modified amines, the phenolic modified amines or the hydroxyalkyl modified amine. Wherein, the cyanoethylated modified amine has the lowest amine activity and the longest operating time. It is suitable for new construction and large-area maintenance of steel bridge decks. Phenolic modified amine has the highest amine activity and the shortest operating time. It is suitable for quick maintenance of small area of steel bridge deck pavement and can meet the requirements of maintenance and opening on the same day. The hydroxyalkylated modified amine has moderate amine activity, moderate operating time and curing time, and is suitable for waterproof bonding layer of steel bridge deck.

Preferred, cyanoethylamine is prepared by Michael reaction of alicyclic amine or amino terminated polyether with acrylonitrile; the alicyclic amine can be one or more mixtures of MDA, IPDA, AEP and 1,3-BAC; the amino terminated polyether can be one or more mixtures of D230, D400 and D2000.

Preferred, phenolic modified amines are prepared by Mannich reaction of alicyclic amines or amino terminated polyether with phenolic compounds and formaldehyde. The alicyclic amines can be one or more mixtures of MDA, IPDA, AEP and 1, 3-BAC, and amino terminated polyether can be one or more mixtures of D230, D400 and D2000.

Preferred, the hydroxyalkyl modified amine is prepared by ring opening addition reaction of aliphatic amine, alicyclic amine or amino terminated polyether with epoxy resin or monoepoxy compound; the aliphatic amine can be one or more mixtures of aliphatic polyamine, polymethylenediamine and aromatic aliphatic amine, and alicyclic amine can be MDA, IPDA, AEP and 1, one or more mixtures in 1,3-BAC, and amino terminated polyether can be one or more mixtures in D230, D400 and D2000.

The preparation method of the anti-fatigue cold mixed epoxy resin material comprising the following steps of:

(1) Preparing the active toughening agent of epoxy terminated organosilicon block polyurethane prepolymer, Put 2-functional polyols and hydroxyl terminated polydimethylsiloxane after dehydration and drying treatment into the reactor with mass ratio of 90:10-50:50, and uniformly mixing, adding polyisocyanate according to the ratio of n(—NCO):n(—OH)=1.01:1-2:1, gradually heated to 50-90° C. under the protection of $N_2$ gas, and reacting for 1-4 h under 0.01-0.08 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heated up to 50-90° C., and continue the reaction until the absorption peak attributable to isocyanate group does not appear on the infrared spectrum, then stop heating to obtain active toughener of epoxy terminated organosilicon block polyurethane prepolymer.

(2) Preparing component A: weighing fluid epoxy resin, active toughener, active diluents, coupling agent, defoamer by quality proportion and feeding into the reactor, under the reaction pressure of 0.02-0.08 MPa, and gradually heated to 60-90° C., the stirring rate is 10-60 r/min, after reaction for one to three hours, filling with $N_2$ gas, restoring the pressure to 0.1 MPa, then component A prepared;

(3) preparing modified amines, the modified amines are cyanoethyl modified amines, phenolic modified amines or hydroxyalkyl modified amine;

The specific steps to prepare cyanoethylamine are as follows: raise the temperature of alicyclic amine or amino terminated polyether to 40-80° C., and the stirring rate is 10-60 R/min. then add acrylonitrile slowly according to the proportion of n (alicyclic amine or amino terminated polyether):n (acrylonitrile)=1:1, and raise the temperature to 60-70° C. after dropping, and continue to react for 1-3 hours to obtain cyanoethylamine.

The specific operation steps of preparing phenolic modified amine are as follows: according to the proportion of n (alicyclic amine, amino terminated polyether or mixture of alicyclic amine and amino terminated polyether):n (phenolic compound)=1:1, alicyclic amine, amino terminated polyether and phenolic compound are put into the reactor, and they are stirred while heating up, with the stirring rate of 10-60 R/min. when the temperature rises to 70-90° C., press n (phenolic compound):n (a When the ratio of aldehyde=1:1-1:3, 37% formaldehyde solution was added slowly, and the reaction was refluxed at 100-110° C. for 2-4 h, then dehydrated in vacuum to obtain phenolic modified amine.

The specific steps of preparing hydroxyalkyl modified amines are as follows: raise the temperature of aliphatic amines, alicyclic amines or amino terminated polyether to 30-80° C., and the stirring rate is 10-60 r/min. then add the epoxy resin or monoepoxy compound slowly in the proportion of n (aliphatic amines, alicyclic amines or amino terminated polyether):n (epoxy resin or monoepoxy compound)=1:1, and continue to react for 1-3 hours after dropping The hydroxylalkyl modified amines were obtained by dehydration at 0.01-0.06 Mpa at 90-100° C.

(4) weighing alicyclic amine or amino terminated polyether or mixture of alicyclic amine and amino terminated polyether by quality proportion, feeding modified amines into the reactor, the stirring rate is 10-60 r/min, then stirring the mixture at room temperature for 1-2 hours, component B produced;

(5) component A and component B uniformly mixing at 1:1-10:1 by mass ratio to obtain the anti-fatigue cold mixed epoxy resin material.

Preferred, the cold mixed epoxy resin materials are used in bridge deck pavement of long-span cable bearing bridge, waterproof bonding material or used for airport pavement, municipal viaduct, ramp and other occasions with high requirements for fatigue resistance of pavement material. According to the requirements of different use occasions, different modified amines are selected, such as large-span cable bearing steel deck pavement small area fast maintenance, which needs to be maintained on the same day and opened on the same day. At this time, phenolic modified amines with the highest amine activity are selected, which have fast curing rate and short operation time. For new construction and large area maintenance of steel deck pavement, cyanoethyl modified amines and amines are selected. The activity is the lowest and the operation time is the longest. For the waterproof bond layer of steel bridge surface, hydroxyalkyl modified amine is selected. The activity of amines is moderate, the operating time and curing time are moderate; other occasions, according to the different requirements of curing rate, can be targeted selection.

When using, it can be spread on the surface of cement concrete pavement, asphalt concrete pavement or steel plate by scraping, rolling or spraying as the bonding layer or waterproof bonding layer; it can also be mixed with graded aggregate in a certain proportion to form the resin mixture for pavement and bridge deck pavement.

With the above solution, the invention an anti-fatigue cold mixed epoxy resin material, preparation method and application thereof, has at least the following advantages:

The preparation of active toughener of epoxy terminated organosilicon block polyurethane prepolymer is designed based on actual application requirements. Based on the principle of block copolymerization, the Si—O—Si flexible segment in the silicone is introduced into the polyurethane prepolymer, and then the epoxy terminated organosilicon block polyurethane prepolymer is prepared by the addition reaction between the isocyanate terminated group in the organosilicon block polyurethane prepolymer and the hydroxyl group in the hydroxyl containing epoxy compound. The introduction of the silicon segment is to widen even more the damping temperature range (or high and low temperature use range) of the material; on one hand, the introduction of terminal base of epoxy is to meet the actual needs of engineering room ambient curing, on the other hand, the introduction of terminal base of epoxy increases the compatibility between the toughener and t epoxy body. It is also to ensure that the prepared material has no phase separation and has good flexibility in a wide temperature range of −10-60° C.

Introduced terminal base of epoxy breaks the limitation that elongation at fracture of epoxy resin system based on sea-island structure is difficult to break through 100%. The active epoxy group in the epoxy terminated organosilicon block polyurethane prepolymer can participate in the cross-linking and curing reaction of epoxy resin, thus, a three-dimensional network structure of "interpenetrating" between flexible chain segment is formed, successfully realized the preparation of A, which elongation at break could be adjusted within the range of 10-1000%.

The present invention modifies alicyclic amine or polyetheramine based on cyanoethylation reaction, phenolic reaction or hydroxyalkylation reaction, the electron cloud density of H atoms in adipose amine, alicyclic amine and polyether amine is regulated by the induction effect of grafting group, so as to realize the controllable adjustment of their reactivity. In addition, the group grafted on adipose amine, alicyclic amine and polyether amine instead of the primary amine H atom can form a steric hindrance effect to a certain extent, which greatly inhibits the reaction activity between the primary amine residual H atom and the epoxy group in the epoxy compound, so as to realize the controllable adjustment of the curing rate of anti-fatigue cold mixed resin. According to the different requirements on the construction time of fatigue-resistant cold mixed resin in different application scenarios, cyanoethylated amine with low activity is suitable for the new construction and large-scale maintenance projects of bridge deck pavement of long-span cable bearing bridge; phenolic modified amine with high activity is suitable for the rapid curing engineering of bridge deck pavement of long-span cable bearing bridge; hydroxyalkylated modified amines with moderate activity is suitable for the waterproof bonding layer of bridge deck pavement of long-span cable bearing bridge.

The anti-fatigue cold mixed epoxy resin material can provide corresponding tensile strength, elongation at fracture, adhesive strength, operating time and curing time according to different usage requirements such as temperature and load. anti-fatigue cold mixed epoxy resin material of the invention has both high-temperature performance and low-temperature performance, and has good fatigue resistance performance within the service temperature range, and is suitable for bridge deck pavement of long-span cable bearing bridge, waterproof bonding material or used for airport pavement, municipal viaduct, ramp and other occasions with high requirements for fatigue resistance of pavement material.

DETAILED DESCRIPTION OF PREFERRED EMBODIMENTS

Figure 1:
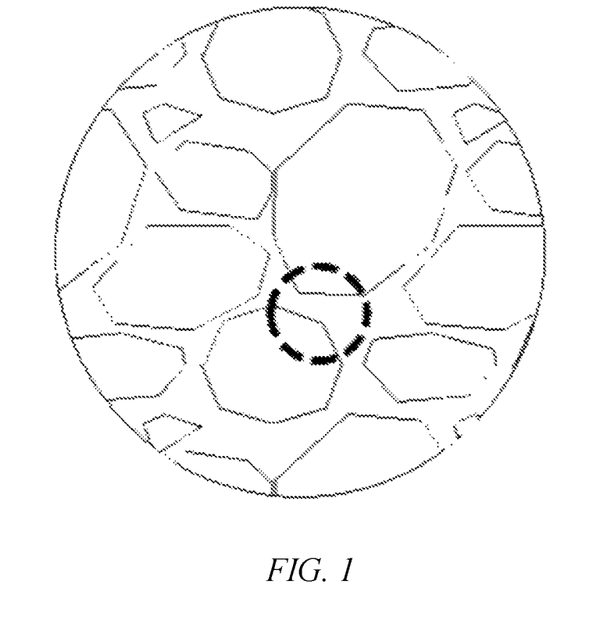
FIG. 1 is a macro-scale model of the anti-fatigue cold mixed epoxy resin material.
Figure 2:
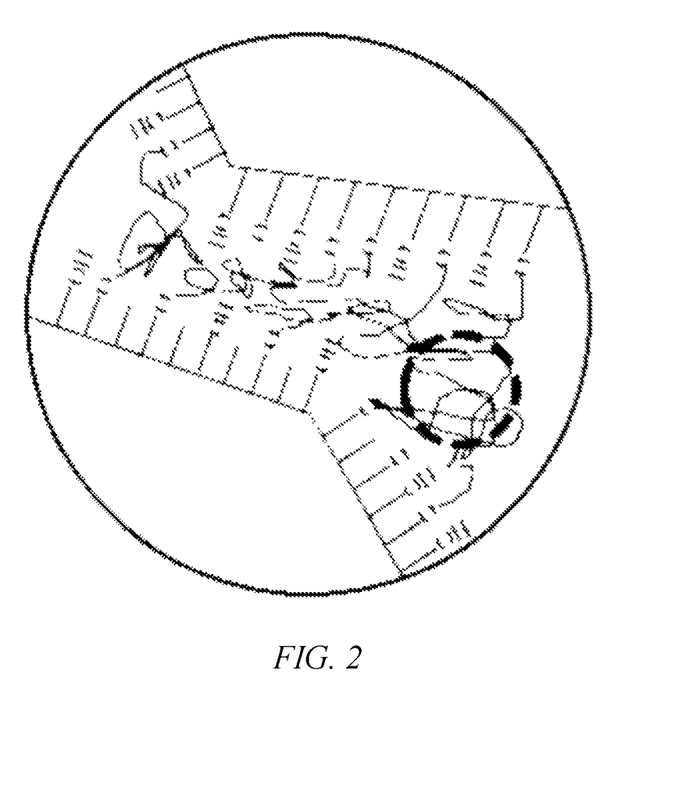
FIG. 2 is a meso-scaled model of the anti-fatigue cold mixed epoxy resin material.
Figure 3:
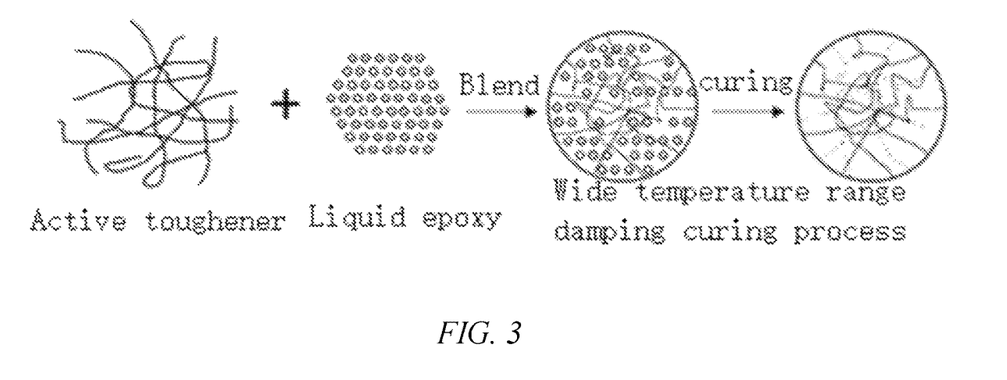
FIG. 3 is a solidified structure of the anti-fatigue cold mixed epoxy resin material.

The technical measures and effects adopted are described in further details below.

Example 1

Preparing component A: put 2-functional polyols and hydroxyl terminated polydimethylsiloxane after dehydration and drying treatment into the reactor with mass ratio of 90:10, and uniformly mixing, adding 4,4'-diphenylmethane diisocyanate according to the ratio of n(—NCO):n(—OH)=1.05:1, gradually heating to 70° C. under the protection of $N_2$ gas, and reacting for 2 h under 0.07 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T1. Then weighing 30 weight parts of fluid epoxy resin, 60 weight parts of active toughener T1, 10 weight parts of active diluents, 1 weight parts of coupling agent and 0.1 weight parts of defoamer and feeding into the reactor, under the reaction pressure of 0.08 MPa, and gradually heated to 70° C., the stirring rate is 60 r/min, after reaction for 2 hours, filling with $N_2$ gas, restoring the pressure to 0.1 MPa, then component A prepared;

Preparing component B: Raise the temperature of 1,3-BAC to 60° C., and the stirring rate is 20 r/min, then add acrylonitrile slowly according to the proportion of n (1,3-BAC):n (acrylonitrile)=1:1, and raise the temperature to 60° C. after dropping, and continue to react for 2 hours to obtain cyanoethylamine G1. Weighing 10 weight parts of amino terminated polyether, feeding 90 weight parts of cyanoethylamine G1 into the reactor, the stirring rate is 20 r/min, then stirring the mixture at room temperature for 1 hour, component B prepared;

Preparing anti-fatigue cold mixed epoxy resin, component A and component B uniformly mixing at 5:1 by mass ratio to obtain the target product. The anti-fatigue cold mixed epoxy resin material is added to the basalt aggregate at a mass ratio of 6-9%, stirring to make it mixed evenly, it can be used as bridge deck pavement material of long-span cable bearing bridge. Table 1 is the properties of anti-fatigue cold mixed epoxy resin and the prepared mixture.

Example 2

Preparing component A: put 2-functional polyester polyol and hydroxyl terminated polydimethylsiloxane after dehydration and drying treatment into the reactor with mass ratio of 80:20, and uniformly mixing, adding 4,4'-diphenylmethane diisocyanate according to the ratio of n(—NCO):n(—OH)=1.5:1, gradually heating to 70° C. under the protection of $N_2$ gas, and reacting for 2 h under 0.07 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T2. Then weighing 20 weight parts of fluid epoxy resin, 70 weight parts of active toughener T2, 10 weight parts of active diluents, 1 weight parts of coupling agent and 0.1 weight parts of defoamer and feeding into the reactor, under the reaction pressure of 0.08 MPa, and gradually heating to 70° C., the stirring rate is 60 r/min, after reaction for 2 hours, filling with $N_2$ gas, restoring the pressure to 0.1 MPa, then component A prepared;

Preparing component B: Raise the temperature of isophorone diamine to 60° C., and the stirring rate is 20 r/min, then add acrylonitrile slowly according to the proportion of n (isophorone diamine):n (acrylonitrile)=1:1, and raise the temperature to 60° C. after dropping, and continue to react for 2 hours to obtain cyanoethylamine G2. Weighing 30 weight parts of amino terminated polyether, feeding 70 weight parts of cyanoethylamine G2 into the reactor, the stirring rate is 20 r/min, then stirring the mixture at room temperature for 1 hour, component B prepared;

Preparing anti-fatigue cold mixed epoxy resin, component A and component B uniformly mixing at 4:1 by mass ratio to obtain the anti-fatigue cold mixed epoxy resin material. The anti-fatigue cold mixed epoxy resin material is added to the basalt aggregate at a mass ratio of 6-9%, stirring to make it mixed evenly, it can be used as bridge deck pavement material of long-span cable bearing bridge. Table 1 is the properties of anti-fatigue cold mixed epoxy resin and the prepared mixture.

Example 3

Preparing component A: put 2-functional polyether polyol and Hydroxyl terminated siloxane after dehydration and drying treatment into the reactor with mass ratio of 90:10, and uniformly mixing, adding toluene diisocyanate according to the ratio of n(—NCO):n(—OH)=1.05:1, gradually heating to 70° C. under the protection of $N_2$ gas, and reacting for 2 h under 0.07 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T3. Then weighing 30 weight parts of fluid epoxy resin, 60 weight parts of active toughener T3, 10 weight parts of active diluents, 1 weight parts of coupling agent and 0.1 weight parts of defoamer and feeding into the reactor, under the reaction pressure of 0.08 MPa, and gradually heating to 70° C., the stirring rate is 60 r/min, after reaction for 2 hours, filling with $N_2$ gas, restoring the pressure to 0.1 MPa, then component A prepared;

Preparing component B: Raise the temperature of M-xylene diamine to 60° C., and the stirring rate is 20 r/min, then add acrylonitrile slowly according to the proportion of n (M-xylene diamine):n (acrylonitrile)=1:1, and raise the temperature to 60° C. after dropping, and continue to react for 2 hours to obtain cyanoethylamine G3. Weighing 20 weight parts of amino terminated polyether, feeding 80 weight parts of cyanoethylamine G3 into the reactor, the stirring rate is 20 r/min, then stirring the mixture at room temperature for 1 hour, component B prepared;

Preparing anti-fatigue cold mixed epoxy resin, component A and component B uniformly mixing at 4:1 by mass ratio to obtain the target product. The anti-fatigue cold mixed epoxy resin material is added to the basalt aggregate at a mass ratio of 6-9%, stirring to make it mixed evenly, it can be used as bridge deck pavement material of long-span cable bearing bridge. Table 1 is the properties of anti-fatigue cold mixed epoxy resin and the prepared mixture.

Example 4

Preparing component A: put 2-functional polyether polyol and Hydroxyl terminated siloxane after dehydration and drying treatment into the reactor with mass ratio of 80:20, and uniformly mixing, adding 4,4'-diphenylmethane diisocyanate according to the ratio of n(—NCO):n(—OH)=1.05:1, gradually heating to 70° C. under the protection of $N_2$ gas, and reacting for 2 h under 0.07 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T4. Then weighing 30 weight parts of fluid epoxy resin, 60 weight parts of active toughener T4, 10 weight parts of active diluents, 1 weight parts of coupling agent and 0.1 parts of defoamer and feeding into the reactor, under the reaction pressure of 0.08 MPa, and gradually heating to 70° C., the stirring rate is 60 r/min, after reaction for 2 hours, filling with $N_2$ gas, restoring the pressure to 0.1 MPa, then component A prepared;

Preparing component B: According to the proportion of n (amino terminated polyether):n (alicyclic amine):n (phenol) =1:1:2, amino terminated polyether, isophorone diamine and phenol are put into the reactor, and they are stirred while heating up, with the stirring rate of 20 r/min. when the temperature rises to 80° C., press n (phenol):n (formaldehyde) when the ratio of aldehyde=1:1, 37% formaldehyde solution was added slowly, and the reaction was refluxed at 105° C. for 2 h, then dehydrated in vacuum to obtain phenolic modified amine G4. Weighing 10 weight parts of alicyclic amine, 10 weight parts of amino terminated polyether, 80 weight parts of phenolic modified amine G4 feeding into the reactor, the stirring rate is 20 r/min, then stirring the mixture at room temperature for 1 hours, component B prepared;

Preparing anti-fatigue cold mixed epoxy resin, component A and component B uniformly mixing at 3:1 by mass ratio to obtain the target product. The anti-fatigue cold mixed epoxy resin material is added to the basalt aggregate at a mass ratio of 6-9%, stirring to make it mixed evenly, it can be used as bridge deck pavement material of long-span cable bearing bridge. Table 1 is the properties of anti-fatigue cold mixed epoxy resin and the prepared mixture.

Example 5

Preparing component A: put 2-functional polyester polyol and Hydroxyl terminated siloxane after dehydration and drying treatment into the reactor with mass ratio of 70:30, and uniformly mixing, adding 4,4'-dicyclohexylmethane diisocyanate according to the ratio of n(—NCO):n(—OH) =1.05:1, gradually heating to 70° C. under the protection of $N_2$ gas, and reacting for 2 h under 0.07 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T5. Then weighing 30 weight parts of fluid epoxy resin, 60 weight parts of active toughener T5, 10 weight parts of active diluents, 1 weight parts of coupling agent and 0.1 weight parts of defoamer and feeding into the reactor, under the reaction pressure of 0.08 MPa, and gradually heating to 70° C., the stirring rate is 60 r/min, after reaction for 2 hours, filling with $N_2$ gas, restoring the pressure to 0.1 MPa, then component A prepared;

Preparing component B: According to the proportion of n (N-aminoethyl piperazine): n(phenol)=1:1, N-aminoethyl piperazine and phenol are put into the reactor, and they are stirred while heating up, with the stirring rate of 30 r/min. when the temperature rises to 75° C., press n (phenol):n (formaldehyde) when the ratio of aldehyde=1:1, 37% formaldehyde solution was added slowly, and the reaction was refluxed at 105° C. for 2 h, then dehydrated in vacuum to obtain phenolic modified amine G5. Weighing 5 weight parts of N-aminoethyl piperazine, 10 weight parts of amino terminated polyether, 95 weight parts of phenolic modified amine G5 feeding into the reactor, the stirring rate is 30 r/min, then stirring the mixture at room temperature for 1 hour, component B prepared;

Preparing anti-fatigue cold mixed epoxy resin, component A and component B uniformly mixing at 5:1 by mass ratio to obtain the target product. The anti-fatigue cold mixed epoxy resin material is added to the basalt aggregate at a mass ratio of 6-9%, stirring to make it mixed evenly, it can be used as bridge deck pavement material of long-span cable bearing bridge. Table 1 is the properties of anti-fatigue cold mixed epoxy resin and the prepared mixture.

Example 6

Preparing component A: put 2-functional polyether polyol and hydroxyl terminated siloxane after dehydration and drying treatment into the reactor with mass ratio of 70:30, and uniformly mixing, adding 4,4'-diphenylmethane diisocyanate according to the ratio of n(—NCO):n(—OH)=1.05: 1, gradually heating to 80° C. under the protection of $N_2$ gas, and reacting for 2 h under 0.06 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T6. Then weighing 15 weight parts of fluid epoxy resin, 75 weight parts of active toughener T6, 10 weight parts of active diluents, 1 weight parts of coupling agent and 0.1 weight parts of defoamer and feeding into the reactor, under the reaction pressure of 0.08 MPa, and gradually heating to 70° C., the stirring rate is 60 r/min, after reaction for 2 hours, filling with $N_2$ gas, restoring the pressure to 0.1 MPa, then component A prepared;

Preparing component B: According to the proportion of n (isophorone diamine):n (nonylphenol)=1:1, Isophorone diamine and Nonylphenol are put into the reactor, and they are stirred while heating up, with the stirring rate of 30 r/min. when the temperature rises to 80° C., press n (nonylphenol):n (formaldehyde) when the ratio of aldehyde=1:1, 37% formaldehyde solution was added slowly, and the reaction was refluxed at 105° C. for 2 h, then dehydrated in vacuum to obtain phenolic modified amine G6. Weighing 10 weight parts of isophorone diamine, 90 weight parts of phenolic modified amine G6 feeding into the reactor, the stirring rate is 30 r/min, then stirring the mixture at room temperature for 1 hour, component B prepared;

Preparing anti-fatigue cold mixed epoxy resin, component A and component B uniformly mixing at 5:1 by mass ratio to obtain the target product. The anti-fatigue cold mixed epoxy resin material is added to the basalt aggregate at a mass ratio of 6-9%, stirring to make it mixed evenly, it can be used as bridge deck pavement material of long-span cable bearing bridge. Table 1 is the properties of anti-fatigue cold mixed epoxy resin and the prepared mixture.

Example 7

Preparing component A: put 2-functional polyether polyol and hydroxyl terminated siloxane after dehydration and drying treatment into the reactor with mass ratio of 70:30, and uniformly mixing, adding 4,4'-diphenylmethane diisocyanate according to the ratio of n(—NCO):n(—OH)=1.05: 1, gradually heating to 70° C. under the protection of $N_2$ gas, and reacting for 2 h under 0.07 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T7. Then weighing 40 weight parts of fluid epoxy resin, 60 weight parts of active toughener T7, 1 weight parts of coupling agent and 0.1 weight parts of defoamer and feeding into the reactor, under the reaction pressure of 0.06 MPa, and gradually heating to 70° C., the stirring rate is 60 r/min, after reaction for 2 hours, filling with $N_2$ gas, restoring the pressure to 0.1 MPa, then component A prepared;

Preparing component B: Raise the temperature of M-xylene diamine to 60° C., and the stirring rate is 30 r/min. then add the phenyl glycidyl ether slowly in the proportion of n (M-xylene diamine):n (phenyl glycidyl ether)=1:1, and continue to react for 2 hours after dropping The hydroxylalkyl modified amines G7 were obtained by dehydration at 0.02

Mpa at 100° C. Weighing 10 weight parts of M-xylene diamine, 90 weight parts of hydroxylalkyl modified amines G7 feeding into the reactor, the stirring rate is 20 r/min, then stirring the mixture at room temperature for 1 hour, component B prepared;

Preparing anti-fatigue cold mixed epoxy resin, component A and component B uniformly mixing at 4:1 by mass ratio to obtain the target product. The anti-fatigue cold mixed epoxy resin material can be used as the waterproof adhesive layer material for the bridge deck pavement of long-span cable bearing type, or for the occasions where the airport pavement, municipal viaduct, ramp and other places have high requirements for waterproof and adhesive performance. Table 2 is the properties of anti-fatigue cold mixed epoxy resin and the prepared mixture.

Example 8

Preparing component A: put 2-functional polyether polyol and hydroxyl terminated siloxane after dehydration and drying treatment into the reactor with mass ratio of 85:15, and uniformly mixing, adding toluene diisocyanate according to the ratio of n(—NCO):n(—OH)=1.05:1, gradually heating to 75° C. under the protection of $N_2$ gas, and reacting for 2 h under 0.08 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T8. Then weighing 50 weight parts of fluid epoxy resin, 50 weight parts of active toughener T8, 1 weight parts of coupling agent and 0.1 weight parts of defoamer and feeding into the reactor, under the reaction pressure of 0.06 MPa, and gradually heating to 70° C., the stirring rate is 60 r/min, after reaction for 2 hours, filling with $N_2$ gas, restoring the pressure to 0.1 MPa, then component A prepared;

Preparing component B: Raise the temperature of isophorone diamine to 60° C., and the stirring rate is 30 r/min. then add the N-butyl glycidyl ether slowly in the proportion of n (isophorone diamine):n (N-butyl glycidyl ether)=1:1, and continue to react for 2 hours after dropping the hydroxylalkyl modified amines G8 were obtained by dehydration at 0.02 Mpa at 100° C. Weighing 20 weight parts of isophorone diamine, 90 weight parts of hydroxylalkyl modified amines G8 feeding into the reactor, the stirring rate is 20 r/min, then stirring the mixture at room temperature for 1 hours, component B prepared;

Preparing anti-fatigue cold mixed epoxy resin, component A and component B uniformly mixing at 4.5:1 by mass ratio to obtain the target product. The anti-fatigue cold mixed epoxy resin material can be used as the waterproof adhesive layer material for the bridge deck pavement of long-span cable bearing type, or for the occasions where the airport pavement, municipal viaduct, ramp and other places have high requirements for waterproof and adhesive performance. Table 2 is the properties of anti-fatigue cold mixed epoxy resin and the prepared mixture.

Example 9

Preparing component A: put 2-functional polyether polyol and hydroxyl terminated siloxane after dehydration and drying treatment into the reactor with mass ratio of 85:15, and uniformly mixing, adding toluene diisocyanate according to the ratio of n(—NCO):n(—OH)=1.05:1, gradually heating to 80° C. under the protection of $N_2$ gas, and reacting for 2 h under 0.06 MPa to obtain silicone block polyurethane prepolymer terminated with isocyanate; filling the reactor with $N_2$ gas, restoring the pressure to 0.1 MPa, then adding a small excess of hydroxy containing epoxy compounds in molar ratio, heating up to 90° C., and continue the reaction until the absorption peak attributable to isocyanate group does not appear on the infrared spectrum, then stop heating to obtain active toughener of epoxy terminated organosilicon block polyurethane prepolymer T9. Then weighing 60 weight parts of fluid epoxy resin, 40 weight parts of active toughener T8, 1 weight parts of coupling agent and 0.1 weight parts of defoamer and feeding into the reactor, under the reaction pressure of 0.07 MPa, and gradually heating to 70° C., the stirring rate is 60 r/min, after reaction for 2 hours, filling with $N_2$ gas, restoring the pressure to 0.1 MPa, then component A prepared;

Preparing component B: Raise the temperature of 1,3-BAC to 60° C., and the stirring rate is 30 r/min. then add the octyl glycidyl ether slowly in the proportion of n (1,3-BAC):n (octyl glycidyl ether)=1:1, and continue to react for 2 hours after dropping the hydroxylalkyl modified amines G9 were obtained by dehydration at 0.02 Mpa at 100° C. Weighing 15 weight parts of 1,3-BAC, 85 weight parts of hydroxylalkyl modified amines G9 feeding into the reactor, the stirring rate is 20 r/min, then stirring the mixture at room temperature for 1 hour, component B prepared;

Preparing anti-fatigue cold mixed epoxy resin, component A and component B uniformly mixing at 5:1 by mass ratio to obtain the target product. The anti-fatigue cold mixed epoxy resin material can be used as the waterproof adhesive layer material for the bridge deck pavement of long-span cable bearing type, or for the occasions where the airport pavement, municipal viaduct, ramp and other places have high requirements for waterproof and adhesive performance. Table 2 is the properties of anti-fatigue cold mixed epoxy resin and the prepared mixture.

The test method adopted by the invention is as follows:

<Operation Time Test>

The operation time of anti-fatigue epoxy resin was tested according to EN 10364-2018

<Tensile Test>

After the component A and Component B were stirred and deaerated, it was directly poured into the mold. After 60° C./1 d or 25° C./7 d curing treatment, it was made into a dumbbell shaped sample according to ASTM D638-2008. After 23° C.±2° C./24 h quenching and tempering treatment, the tensile properties of anti-fatigue cold mixed epoxy resin were tested at a tensile rate of 50 mm/min using a QJ211S tensile testing machine (Shanghai Qingji Instrument Technology Co., Ltd.).

<Pull Off Test for Adhesion>

It was coated with a proper amount of the anti-fatigue cold mixed epoxy resin which has been stirred and de-aerated on the surface of steel deck with Sa2.5. After 60° C./1 d or 25° C./7 d curing treatment, the pull off strength of adhesion was assessed according to ASTM D4541-2017.

<Marshall Test>

The component A and component B were mixed to the anti-fatigue epoxy resin binder, then the anti-fatigue cold mixed epoxy resin binder was mixed with graded stone (Zhenjiang Maodi Basalt Aggregate, 5-10 mm:3-5 mm:1-3 mm:0.075-1 mm:mineral powder=25:21.5:22:23:8.5) according to 6-9 wt % asphalt-aggregate ratio to form anti-fatigue cold mixed epoxy resin mixture. The anti-fatigue cold mixed epoxy resin mixture Marshall test samples were molded according to ASTM D6926-2016. And after 60° C./1 d or 25° C./7 d curing treatment, the Marshall stability test and the submerged Marshall stability test were conducted according to ASTM D6927-2015.

<Freeze Thaw Split Test>

The freeze-thaw split test sample of anti-fatigue cold mixed epoxy resin mixture was prepared according to the <Marshall Test> procedure, and then the freeze-thaw split test was conducted according to ASTM D6931-2017.

Rutting Test

The component A and component B were mixed to anti-fatigue cold mixed epoxy resin binder, then the anti-fatigue cold mixed epoxy resin binder was mixed with graded stone (Zhenjiang Maodi Basalt Aggregate, 5-10 mm:3-5 mm:1-3 mm:0.075-1 mm:mineral powder=25:21.5:22:23:8.5) according to 6-9 wt % asphalt-aggregate ratio to form anti-fatigue cold mixed epoxy resin mixture. The rutting test sample of anti-fatigue cold mixed epoxy resin mixture was prepared according to EN12697-33-2019. And after 60° C./1 d or 25° C./7 d curing treatment, the rutting test was conducted according to EN12697-22.

Bending Test

The anti-fatigue cold mixed epoxy resin mixture bending sample was prepared according to the <rut test> procedure, then the bending test was conducted according to EN12697-26-2018.

Four Point Bending Fatigue Life Test of Mixture

The anti-fatigue cold mixed epoxy resin mixture bending sample was prepared according to the <rut test> procedure. Then the Pavetest B210 KIT independent servo pneumatic 4-point bending beam test system (15° C., 10 Hz, 800με) was used to conduct the four-point bending fatigue life test of the anti-fatigue cold mixed epoxy resin mixture according to ASTM D4760-2010.

Pull-Out Test of Composite Parts

The anti-fatigue cold mixed epoxy resin mixture bending sample was prepared according to the <rut test> procedure. Firstly, the core drill was used to drill the epoxy resin mixture to the steel deck, then the steel drawing head was pasted on the surface of the epoxy resin mixture, and the pull off strength between the epoxy resin mixture and the steel deck was tested.

Three-Point Bending Fatigue Life Test of Composite Beam

The composite beam was prepared by anti-fatigue cold mixed epoxy resin mixture and steel plate, it is used for three-point bending fatigue life test. The composite beam was made of Q345 steel deck, the length of the steel deck is 380 mm, the width is 10 mm, and the thickness is 14 mm; The anti-fatigue cold mixed epoxy resin mixture which thickness is 55 mm was paved on the composite beam. The Pavetest DTS-30 dynamic mechanical test system was used to test, applied 10 Hz, 9 kN sine wave to the composite beam at 15° C., recorded the load times of the composite beam without paving, delamination and cracking.

TABLE 1

The Properties of Anti-Fatigue Cold Mixed Epoxy Resin and the Prepared Mixture

| | | Epoxy asphalt | | Anti-fatigue cold mixed epoxy resin | | | | | |
|---|---|---|---|---|---|---|---|---|---|
| Comparison items | | $B_{JV}^b$ | $TAF^c$ | 1 | 2 | 3 | 4 | 5 | 6 |
| Cements | Toughening technology | Asphalt toughening resin | | Flexible curing agent | | | | | |
| | Operation time test at 23° C. (h) | $0.8^d$ | $2.5^e$ | 5.1 | 6.5 | 5.3 | 1.5 | 1.3 | 1.8 |
| | Tensile strength at 23° C. (MPa) | 1.9 | 1.1 | 4.1 | 2.6 | 3.2 | 3.6 | 3.2 | 2.3 |
| | Elongation at break at 23° C. | 273 | 382 | 233 | 433 | 345 | 274 | 343 | 458 |
| Mixture | Mixing temperature | 120 | 170 | 10-40 | | | | | |
| | Curing condition | 120° C., 5 h | 60° C., 4 d | 60° C., 1 d | | | | | |
| | Traffic opening Hours | >28 d | 3-7 d | 1-3 d | | | 2-8 h | | |
| | Marshall stability at 60° C. (kN) | 52.0 | 72.5 | 75.3 | 69.5 | 63.4 | 55.4 | 59.8 | 51.2 |
| | Flow value at 60° C. (0.1 mm) | 25.2 | 37.6 | 28.7 | 35.8 | 31.5 | 25.2 | 29.8 | 23.4 |
| | Dynamic stability at 60° C. (cycle/mm) | | | >6000 | | | | | |
| | Immersion residual stability at 60° C. (%) | 94.6 | 99.2 | 92.1 | 93.7 | 93.1 | 88.5 | 93.2 | 89.1 |
| | Split strength ratio (%) | 97.4 | 96.0 | 88.9 | 91.9 | 89.9 | 91.9 | 91.5 | 87.9 |
| | Ultimate bending strain at −10° C. (με) | 3130 | 3863 | 6809 | 7832 | 6323 | 6856 | 7432 | 7139 |
| | Four point bending fatigue life (10000 times)/15° C., 800 με | <100 | <100 | >100 | | | | | |

The best asphalt aggregate ratio of A-epoxy asphalt mixture is 6.5 wt %, the best asphalt aggregate ratio of fatigue resistant cold mixed resin mixture is 7.5 wt %; $B_{IV}^{b}$ is ChemCo of the United States. The two-component epoxy asphalt provided by system company, A:B=100:585; $TAF^c$ is the two-component epoxy asphalt provided by Dayou Construction Co., Ltd. of Japan, A:B:70 #Base asphalt=56:44:100; the time required for the Brinell viscosity to rise to 1000 MPa·s at d-120° C.; the time required for the Brinell viscosity to rise to 1000 MPa·s at e-170° C.

The invention discards the asphalt with poor phase stability and easy precipitation as the toughening phase, and based on the interpenetrating network toughening technology, a cold mixed epoxy resin without asphalt for mixing is prepared. On the one hand, the abandonment of asphalt phase overcomes the construction limitation that traditional epoxy asphalt needs high-temperature mixing; on the other hand, it avoids the hardening and catalysis phenomenon caused by the precipitation of asphalt phase in epoxy asphalt after long-term use. From the data in the above table, it can be seen that the fatigue resistant cold mixed epoxy resin for mixing can be constructed in a wide temperature range of 10-40° C., and the open traffic time can be adjusted in the range of 2 h-3 d, which can meet the requirements of the actual project for different curing rates such as construction time and curing time. It can be seen from the data in the above table that the preparation of asphalt free cold mixed epoxy resin based on interpenetrating network toughening technology solves the performance defects of the traditional epoxy asphalt with insufficient long-term fatigue performance, and its ultimate bending tensile strain (−10° C.) and four-point bending fatigue life (15° C., 800µε) are greatly improved compared with the traditional epoxy asphalt.

It can be seen from the data in the above table that, compared with the American epoxy asphalt waterproof adhesive layer $B_{IF}^{a}$, the invention abandons the asphalt with poor phase stability and easy precipitation as the toughening phase, and based on the interpenetrating network toughening technology, a cold mixed fatigue resistant epoxy resin for the (waterproof) adhesive layer without asphalt is prepared, which can be constructed at room temperature and maintained at room temperature, and has tensile strength, adhesion drawing and composite parts The drawing strength is obviously improved, so the three-point bending fatigue life of the composite beam can reach more than 12 million times.

The invention claimed is:

1. An anti-fatigue cold mixed epoxy resin material, characterized in that it comprises: component A and component B with a mass ratio of 1:1-10:1, wherein:
   a mass composition of component A is as follows:
   a fluid epoxy resin, 1-100 weight parts;
   an active toughening agent, 10-90 weight parts;
   active diluents, 0-20 weight parts;
   a coupling agent, 0.1-5 weight parts;
   a defoamer, 0.01-2 weight parts;
   a mass composition of component B is as follows:
   an alicyclic amine or amino terminated polyether, 1-100 weight parts;
   cyanoethylamine, phenolic modified amine or hydroxyalkyl modified amine, 1-100 weight parts,
   wherein the active toughening agent is an epoxy terminated organosilicon block polyurethane prepolymer prepared by the reaction of hydroxyl containing epoxy compound and organosilicon block polyurethane prepolymer.

TABLE 2

Properties of Anti-fatigue Cold Mixed Epoxy Resin and the Prepared mMixture.

| Comparison items | | $B_{IF}^{a}$ | $HYP^b$ | 7 | 8 | 9 |
| --- | --- | --- | --- | --- | --- | --- |
| Toughening/softening technology | | Asphalt toughening resin | Flexible curing agent | Flexible curing agent | | |
| Mixing temperature/° C. | | 120 | 20-60 | 10-60 | | |
| Curing condition | | 120° C., 5 h | 30° C., 4 d | Indoor temperature, 4-24 h | | |
| Fusing behavior at 200° C. | | infusible | fusible | infusible | | |
| Coating amount (kg/m²) | | 0.5-0.7 | 0.4-0.6 | 0.8-1.2 | | |
| Operation time test at 23° C. (h) | | 0.9c | 24 | 3.0 | 3.3 | 2.9 |
| Tensile strength at 23° C. (MPa) | | 1.7 | 4.1 | 19.7 | 15.9 | 18.1 |
| Elongation at break at 23° C. | | 381 | 766 | 135 | 156 | 147 |
| The pull off strength of adhesion (MPa) | 23° C. | 2.98 | 11.09 | >20.68 | | |
| | 70° C. | 0.38 | 1.51 | 9.21 | 5.84 | 7.43 |
| Pull off theory of Compound sample | 23° C. | >3.0 MPa, Cohesive failure of mixture | >0.9 MPa, Delamination of mixture | >1.8 MPa, Delamination of mixture | | |
| | 70° C. | >0.9 MPa, Cohesive failure of mixture | >0.3 MPa, Delamination of mixture | >0.7 MPa, Delamination of mixture | | |
| Three-point bending fatigue life of composite beam (ten thousand times), 9 kN, 10 Hz | | <1200 | <1200 | >1200 | | |

$B_{IV}^{b}$ is ChemCo of the United States The two-component epoxy asphalt provided by system company, A:B = 100:445; $hyp^B$ is a two-component epoxy coating oil provided by Dayou Construction Co., Ltd., A:B = 50:50; the time required for the Brinell viscosity to rise to 1000 MPa · s at a −120° C.

2. An anti-fatigue cold mixed epoxy resin material according to claim 1, characterized in that: the epoxy compound containing hydroxyl is any one of or a mixture of two or more than two of hydroxylglycidyl ether, bisphenol A type epoxy resin or bisphenol F type epoxy resin; the organosilicon block polyurethane prepolymer is prepared by polymerization reaction of hydroxyl terminated polydimethylsiloxane, 2-functional polyether polyol or 2-functional polyester polyol, with diisocyanate.

3. An anti-fatigue cold mixed epoxy resin material according to claim 1, characterized in that: the alicyclic amine or amino terminated polyether can take any one of or a mixture of two or more than two of them; the amino terminated polyether is any one of or a mixture of two or more than two of polyoxy propylene diamine, propylene oxide triamine and ethylene oxide diamine.

4. An anti-fatigue cold mixed epoxy resin material according to claim 3, characterized in that: the cyanoethylamine is prepared by Michael reaction of alicyclic amine or amino terminated polyether with acrylonitrile.

5. An anti-fatigue cold mixed epoxy resin material according to claim 3, characterized in that: the phenolic modified amines are prepared by Mannich reaction of alicyclic amines or amino terminated polyether with phenolic compounds and formaldehyde.

6. An anti-fatigue cold mixed epoxy resin material according to claim 3, characterized in that: the hydroxyalkyl modified amine is prepared by ring opening addition reaction of aliphatic amine, alicyclic amine or amino terminated polyether with epoxy resin or monoepoxy compound; the aliphatic amine can be any one of or a mixture of two or more than two of aliphatic polyamine, polymethylenediamine and aromatic aliphatic amine.

7. A method of producing an anti-fatigue cold mixed epoxy resin material according to claim 1, comprising the following steps:
(1) Preparing the active toughening agent of epoxy terminated organosilicon block polyurethane prepolymer;
(2) Weighing the fluid epoxy resin, the active toughening agent, the active diluents, the coupling agent, the defoamer by quality proportion and feeding them into the reactor, under the reaction pressure of 0.02 MPa, and gradually heated to 60-90° C., the stirring rate is 10-60 r/min, after reaction for one to three hours, filling with $N_2$ gas, restoring the pressure to 0.1 MPa, to prepare component A;
(3) Preparing modified amines, the modified amines are cyanoethyl modified amines, phenolic modified amines or hydroxyalkyl modified amine;
(4) Weighing the alicyclic amine or amino terminated polyether or mixture of alicyclic amine and amino terminated polyether by quality proportion, feeding modified amines into the reactor, the stirring rate is 10-60 r/min, then stirring the mixture at room temperature for 1-2 hours, to prepare component B;
(5) Mixing component A and component B uniformly according to the mass ratio of 1:1-10:1 to obtain the target product.

8. A method of producing an anti-fatigue cold mixed epoxy resin material according to claim 7, characterized in that: in the step (1), preparing the active toughening agent of epoxy terminated organosilicon block polyurethane prepolymer by the following steps:

putting 2-functional polyols and hydroxyl terminated polydimethylsiloxane after dehydration and drying treatment into the reactor according to the mass ratio of 90:10-50:50, and then mixing them uniformly, adding polyisocyanate according to the ratio of n(-NCO):n(-OH)=1.01:1-2:1, gradually heated to 50-90° C. under the protection of $N_2$ gas, and reacting for 1-4 h under 0.01-0.08 MPa to obtain silicone block polyurethane prepolymer terminated with isocyanate;

filling the reactor with $N_2$ gas, restoring the pressure to 0.1 MPa, then adding a slight excess of hydroxy containing epoxy compounds in molar ratio, heated to 50-90° C.; and continuing the reaction until the absorption peak derived from isocyanate group does not appear on the infrared spectrum, then stop heating to obtain the active toughening agent of epoxy terminated organosilicon block polyurethane prepolymer.

* * * * *